United States Patent
Lutkenhaus et al.

(10) Patent No.: US 7,197,523 B2
(45) Date of Patent: Mar. 27, 2007

(54) EFFICIENT USE OF DETECTORS FOR RANDOM NUMBER GENERATION

(75) Inventors: Norbert Lutkenhaus, Erlangen (DE); Jayson L. Cohen, New York, NY (US); Hoi-Kwong Lo, New York, NY (US)

(73) Assignee: Magiq Technologies, Inc., New York, NY (US)

(*) Notice: Subject to any disclaimer, the term of this patent is extended or adjusted under 35 U.S.C. 154(b) by 703 days.

(21) Appl. No.: 10/472,673

(22) PCT Filed: May 3, 2002

(86) PCT No.: PCT/US02/11873

§ 371 (c)(1),
(2), (4) Date: Sep. 22, 2003

(87) PCT Pub. No.: WO02/091147

PCT Pub. Date: Nov. 14, 2002

(65) Prior Publication Data

US 2004/0139132 A1    Jul. 15, 2004

Related U.S. Application Data

(60) Provisional application No. 60/289,591, filed on May 9, 2001.

(51) Int. Cl.
*G06F 7/58* (2006.01)

(52) U.S. Cl. .................................................... 708/255

(58) Field of Classification Search ............... 708/255
See application file for complete search history.

(56) References Cited

U.S. PATENT DOCUMENTS

| | | | | |
|---|---|---|---|---|
| 4,833,633 A | * | 5/1989 | Morris | 708/250 |
| 5,987,483 A | * | 11/1999 | Edelkind et al. | 708/250 |
| 6,076,097 A | * | 6/2000 | London et al. | 708/250 |
| 6,360,183 B1 | * | 3/2002 | Shilton | 702/179 |
| 6,393,448 B1 | * | 5/2002 | Dultz et al. | 708/250 |

* cited by examiner

*Primary Examiner*—D. H. Malzahn
(74) *Attorney, Agent, or Firm*—Opticus IP Law PLLC

(57) ABSTRACT

Apparatus for and methods of random number generation are disclosed, wherein a detector receives a group of n light pulses having single-photon intensity levels. Each of the n light pulses has a probability of less than one to produce a successful detection event at its time of arrival at the detector, and the detector is adapted to detect only one of the n pulses in the group. This single detection per group is thus a discrete random event that occurs only during one of n fixed time slots. The random event occurring during one of n timeslots is converted into a corresponding random integer from 1 to n. A series of such random numbers is generated by using a plurality of groups of n light pulses.

8 Claims, 5 Drawing Sheets

EFFICIENT USE OF DETECTORS FOR RANDOM NUMBER GENERATION

CROSS-REFERENCE TO RELATED APPLICATIONS

This application claims priority under 35 USC 119(e) and the Paris Convention to U.S. provisional application Ser. No. 60/289,591, filed May 9, 2001. The entire contents of that application are hereby incorporated by reference.

BACKGROUND OF THE INVENTION

1. Field of the Invention

The invention relates to random number generators.

2. Description of the Background

A Random Number Generator (RNG) is a variable X whose value takes on a sequence of numbers in which the probability of any particular sequence is equally likely. The idea of random number generation refers to the probability of generation of any sequence being equal.

Random numbers mean sets or sequences of numbers generated by a RNG.

Pseudo-random numbers mean any distribution or sequence of numbers produced by a deterministic algorithm. Conventional software-based random number generators (RNGs) produce pseudo-random numbers.

True-random numbers mean any distribution or sequence of numbers relying upon randomness in physical or natural events believed to provide random events. Thermal noise in electronics and radioactive decay are believed to provide truly random events.

Herein, the symbol $\tau_d$ defines the dead time or recovery time of a detector.

A single photon detector means a detector with a substantial probability of detecting the existence of a single photon.

APD herein means an avalanche photodetector. An APD may be a single photon detector.

An APD dead time, $\tau_d$, is a duration of time after a detection event during which the APD remains inactive or unable to respond fully to light incident on the APD.

APDs can be designed to operate (detect photons) in spectral windows spanning 850 nm, 1310 nm, and 1550 nm. Silicon, Germanium, and InGaAs APD detectors are common. R. G. Brown, K. D. Ridley, and J. G. Rarity, Appl Opt 25, 4122 (1986) and Appl Opt 26, 2383 (1987) describes an APD reverse-biased above breakdown in Geiger mode that has a dead time $\tau_d$.

Effective dead times means a duration of time after a detection event during which the detector fails to respond fully to incident light due to "after-pulse" effects.

After pulse effects in APDs occur, particularly InGaAs/InP APDs sensitive at 1550 nm, due to charges trapped after a detection avalanche in an APD. After pulsing effects are described in M. Bourennane et al., Optics Express 4, 383 (1999); A. Karlsson et al., Circuits and Devices 11, 34 (1999).

Rapidly quenching the avalanche in an APD reduces the APDs dead time. Passive avalanche quenching means quenching the avalanche in an APD using passive electronic elements. Dead times for typical passively quenched APDs are 1 μs. Active quenching means quenching the avalanches in an APD using active electronic circuits.

A gated mode reduces dark count rates in a detector, such as an APD. The gate duty cycle in the prior art of APD usage comprises one short time window of the order of the pulse duration for detection followed by a long time window on the order of the dead time $\tau_d$. See M. Bourennane et al., J Mod Opt 47, 563 (2000). A pulsed light source's repetition rate $1/\tau_s$, can be changed relatively easily and can be orders of magnitude larger than the detector recovery rate $1/\tau_d$. Light sources that can be used in conjunction with APDs include LEDs, visible and infrared lasers, and vapor lamps. Imperfect detectors (with non-unity detection efficiency) and channel losses can be lumped into an effective transmission coefficient $$\eta = \eta_{trans}\eta_{detector}. \qquad (1)$$

The light transmission channel may be any medium or means, such as free space, optical fiber, or waveguide, to convey electromagnetic signals from a source to a detector. Typical detector efficiencies $\eta_{detector}$ are 50–75% for silicon APDs detecting light at 600–850 nm and 10–15% for InGaAs APDs at 1550 nm.

The publication by A. Stefanov et al., at URL: http://xxx.lanl.gov/abs/quant-ph/9907006, proposes detecting weak optical signals using single photon detectors as a method of generating true random numbers. Stefanov et al. proposes a pulsed light-emitting diode (LED) attenuated to average photon number ñ<<1, two optical paths in fiber, and one passively quenched APD for single photon detection. The apparatus splits the signal pulse between the two optical paths, one short and one long, to the detector. This creates two possible arrival time slots at the detector, one for each path, which are assigned bit values 0 and 1. Only a signal from one path or the other causes a detection event, but exactly which path per pulse triggers this detection is a random process. By using an electronic clock and logic circuit, the apparatus reconciles the successful detection of a signal at one time slot or the other with the transit time from source to detector, producing one bit per detection event. The Stefanov et al. proposed method alternates between an active and inactive period, $\tau_{total}=\tau_a+\tau_i$, where $\tau_a$ denotes the active period and $\tau_i$ the inactive, for each detection cycle. Their apparatus pulses the source once per cycle so that a photon on the short path arrives at the beginning of the active period. Stefanov and coworkers use an active period of $\tau_a \approx 70$ ns with photons on the split paths set to arrive at the detector only during 10 ns time windows at either end. They use a passively quenched detector with $\tau_d \approx 1$ μs. Stefanov and coworkers set the inactive period to be equal to the dead time $\tau_d$. To synchronize the system, the method employs a source period $\tau_s$ that is equal to $\tau_{total}$: the source and detector run at the same clock speed.

The present inventors calculated the RNG rate of Stefanov's method. Their method determines the random number generation rate. Their Poisson-distributed photon number source with small average photon number ñ gives a rate $$R=(1-e^{-\eta ñ})/\tau_s \approx \eta ñ/\tau_{total}. \qquad (2)$$

Stefanov and coworkers set ηñ to be ~0.1. The random bit generation rate from (2) is R≈100 kHz.

P. Townsend in patent PCT/GB95/01940 (US005953421) and IEEE Photonics Technology Letters 10, 1048 (1998), demonstrate schemes to distribute quantum signals as a cryptographic key over a kilometer or more of optical fiber. Quantum cryptography requires a quantum channel between source and detector, which means a channel that does not degrade the quantum information (e.g., polarization and/or phase) encoded in the signal pulses. For example, photo detection occurs in an actively quenched APD without gating and with $\tau_d \approx 50$ ns. See IEEE Photonics Technology Letters 10, 1048 (1998), which discloses a system wherein a photon can arrive at the detector during two distinct time slots, corresponding to bit values 0 or 1. The pulse period $\tau_s$ is 2.5 ns. The losses and average photon number effectively give $\eta\tilde{n}$~0.006, yielding an average count rate of 2.4 MHz and quantum bit rate R≈1.2 MHz.

SUMMARY OF THE INVENTION

One object of the present invention is to generate random numbers.

Another object of the invention is to rapidly generate random numbers.

Another object of the invention is to provide an apparatus and method that provide the random number generation rate R substantially larger than $1/\tau_d$.

In one aspect, the invention provides a system and method for RNG, comprising a transmitter for transmitting a sequence of pulses each having an intensity; a detector for detecting pulses; a transmission channel channeling said sequence of pulses from said transmitter to said detector such that said detector would detect an average of one pulse per sequence of n pulses, wherein said sequence of pulses is transmitted during a first period of time; and means for determining a second period from initiating said pulses to when said detector detects said pulse.

In another aspect, the invention provides a system and method for RNG, comprising: transmitting to a detector a sequence of pulses each having an intensity such that said detector would detect an average of one pulse per sequence of n pulses, wherein said sequence of pulses is transmitted during a first period of time; detecting a pulse in said detector; and determining a second period from initiating said pulses to when said detector detects said pulse.

An embodiment of an apparatus of the present invention comprises a pulsed source of coherent or incoherent light, an attenuator, an optical channel, and a detector. The source produces a plurality of sequences each of n pulses. The symbol ñ defines the average photon number of each pulse on arrival at the detector. The attenuator dims the light to the single photon (or low photon number) level per pulse. In this context "low photon number" means ñ less than 1. The channel conveys the light pulses from source to (attenuator and from attenuator to) detector. The single photon detector detects one pulse from each sequence of n dim light pulses per detection cycle.

The remaining elements of the apparatus control the above elements and comprise a controller, detector and gating electronics, a time-interval analyzer, and a microprocessor/memory device. A controller/pulser/clock performs timing and operational processing functions, like pulsing the optical source and synchronizing the source and detection cycles. The controller also triggers the gating electronics to change the bias voltage on the detector and triggers the time-interval analyzer to start measuring the elapsed time until a photo detection event. The circuitry of the detector and gating electronics, possibly controlled by the controller, allow for the detection of the weak light signals. The gating electronics bias the detector to set the detection efficiency either to the maximum (detector on) or to approximately zero (detector off), respectively. The detector electronics quench the electronic avalanche that is caused by a successful detection. The detector electronics also send an electronic output signal to the time-interval analyzer after a successful photo detection event in order to stop the elapsed time measurement. A time-correlated photon counting system or other time-interval analyzer measures the elapsed time until a successful photo detection with respect to the start trigger (timing reference) described above. The time-interval analyzer converts the elapsed time into a voltage. It bins that voltage (the measure of the arrival time) into one of n voltage ranges corresponding to the n pulses. It outputs a digital or analog signal that specifies that bin number. A microprocessor/memory device accepts the output from the time-interval analyzer. It then performs storage and computational operations on the bin numbers from successive sequences of light pulses. Electrical connections may be made between all electronic components for synchronizing and systematizing the electronic elements of the random number generation apparatus.

The methods of the invention use the embodiment of the apparatus summarized above to create a random integer from a plurality of sequences of n pulses emitted by the source. The attenuator attenuates the light so that each pulse of each sequence has a probability less than one (and ideally 1/n) to cause a successful detection. In the current invention, the channel for light propagation serves as a predictable way to relay the pulses to the detector. Predictable here means that the user can measure the approximately stationary probability distribution for photo detection of the n pulses.

In a first method, the entire time duration from the arrival at the detector of the leading edge of the first pulse to the falling edge of the nth pulse defines an on-period for the detector during which photo detections can take place. The expected arrival time (of the rising edge) of the first pulse at the detector defines a timing reference, used as the trigger time for the time-interval analyzer of the apparatus. At or just before this time, the controller signals the gating electronics to bias the detector above breakdown, initiating the detector on-period. The gating electronics only change the bias below breakdown at the expected time of the falling edge of the nth pulse, ending the on-period and initiating the off-period. During the on-period each of the n pulses can arrive at the detector only within a fixed time slot, numbered 1 to n, with respect to the trigger time. For each on-period, the detector detects only one of the n pulses, but the exact pulse that the detector detects per sequence is random. Hence, the time slot number of the detected pulse corresponds to a random integer from 1 to n. Since the detection electronics send a signal to stop the time-interval analyzer after a successful detection, the bin number that is output by the time interval analyzer of the apparatus is equal to the time slot number and therefore is a random integer. In other words the apparatus transforms a measurement of the detected pulse's arrival time with respect to the timing reference into a random integer. During the off-period, the controller controls the gating electronics to hold the detector's bias voltage below breakdown for a time equal to the dead time of the detector. During this off-period the source may emit light pulses, but the detector is off and cannot detect. When this off-period has elapsed, the controller synchronizes the next source pulse as the first pulse of a new on-period.

The cycle repeats to create the next random integer from the new sequence of n pulses. The microprocessor/memory device collects the random integers, which may be statistically correlated and biased, and converts a string of random integers into a string of statistically independent random bits using computational operations. If the random integers created by successful detections are statistically independent already, each integer represents $\log_2 n$ random bits. As a result, for short on-periods compared to the off-periods, this method can provide a random digital number generation rate that approaches $R = \log_2 n/\tau_d$. This rate can be substantially larger than $1/\tau_d$. Moreover, the gating technique, which turns off the detector during the off-period, reduces the dark count rates relative to a detector that remains biased continuously.

A second method that uses a preferred embodiment of the apparatus is an adaptation of the first method. The controller in the second method breaks the on-period into n on- and off-sub-periods electronically. During the on-sub-period the controller triggers the gating electronics to turn on the detector only during the time windows that correspond to the expected arrival times of the n pulses. The off-sub-periods are the time windows between pulses, during which the gating electronics turn off the detector. Otherwise, this method operates like the first. This second method lowers the dark count rate further since the light pulse durations and therefore the on-sub-periods may be much shorter than the time between light pulses, given by the inverse of the source repetition rate. For short on-periods compared to off-periods, this method can provide a random bit generation rate that approaches $R = \log_2 n / \tau_d$.

A third method of using the apparatus can work as an adaptation of either of the first two methods. In the first two methods the time window encompassing the fixed number of n pulses defines each detection on-period. By relaxing the constraint of a fixed on-period duration, the dark count rate can be reduced and the speed of those methods can be increased. In this third method the off-period begins immediately after a successful detection event. The detector electronics sends a feedback electronic signal to the controller at the time of a successful detection event. Immediately after receiving that signal, the controller sends a signal to the gating electronics to lower the detector voltage below breakdown and initiate the off-period. This action is a departure from the first two methods, where the controller waits until the end of the nth pulse to initiate the off-period. The system now waits an off-period equal to the dead time before the cycle begins again with a source pulse. The average on-period now has a duration that is shorter than the previous two methods, which reduces the dark count probability. In addition, by initiating the off-period after a successful detection, this method prevents dark counts from after-pulsing. These may occur in the first two methods since the gating electronics maintain or raise the bias voltage above breakdown before the detection avalanche has quenched fully. For short on-periods compared to off-periods, this method can provide a random bit generation rate that approaches $R = \log_2 n / \tau_d$.

In a fourth method using the apparatus, a single photon source emits one photon per detection cycle. Alternatively, a classical light source, such as a laser or LED, emits a single pulse per detection cycle. The apparatus now contains additional means to split signals and delay the split signals with respect to one another. Using these, the apparatus can split the single pulse into a superposition of n different sub-pulses, separated in time. For example, this method uses $\sim \log_2 n$ 50:50 optical fiber couplers and fiber optic delay lines. The source pulse enters the alternating system of fiber coupler-delay line-fiber coupler-delay line . . . After each fiber coupler, the signal splits between the two paths in the fiber delay line, one long and one short, before the next fiber coupler. After the last delay line, an additional fiber coupler or other beam recombination means recombines the two delay paths. These n sub-pulses now act as the n separate pulses used in the above three methods, and the definitions of the detector cycles follow directly from the n sub-pulse sequences. As a result, for short on-periods compared to off-periods, this method can provide a random bit generation rate that approaches $R = \log_2 n / \tau_d$.

Generally, the invention's use of random events from successive sequences of n discrete possibilities provides a novel way to produce random numbers. Simultaneously, the invention provides a method to reduce dark count rates and to maximize efficient detector usage when implemented with a preferred embodiment of an apparatus that uses dim light pulses.

DESCRIPTION OF THE PREFERRED EMBODIMENTS

Figure 1:
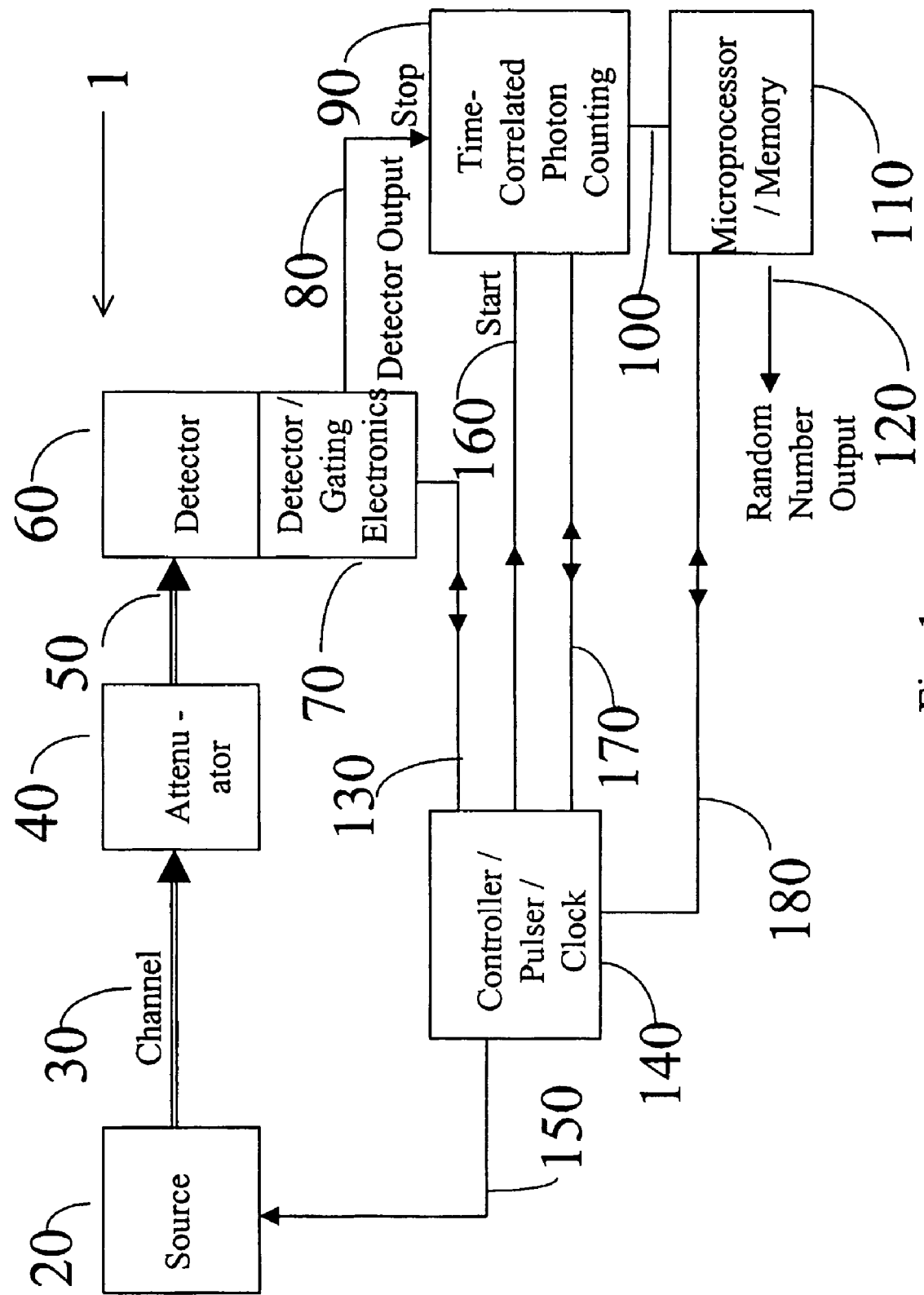
FIG. 1 is a schematic of an apparatus embodying the present invention.

FIG. 1 shows a system 1. System 1 includes photon or optical pulse source 20, light conducting channel 30, attenuator 40, light conducting channel 50, detector 60, detector gating electronics 70, detector output 80, time correlated photon counting 90, data line 100, microprocessor/memory 110, random number output 120, control/data line 130, controller/pulser/clock 140, control line 150, control line 160, control/data line 170, and control/data line 180.

Figure 2:
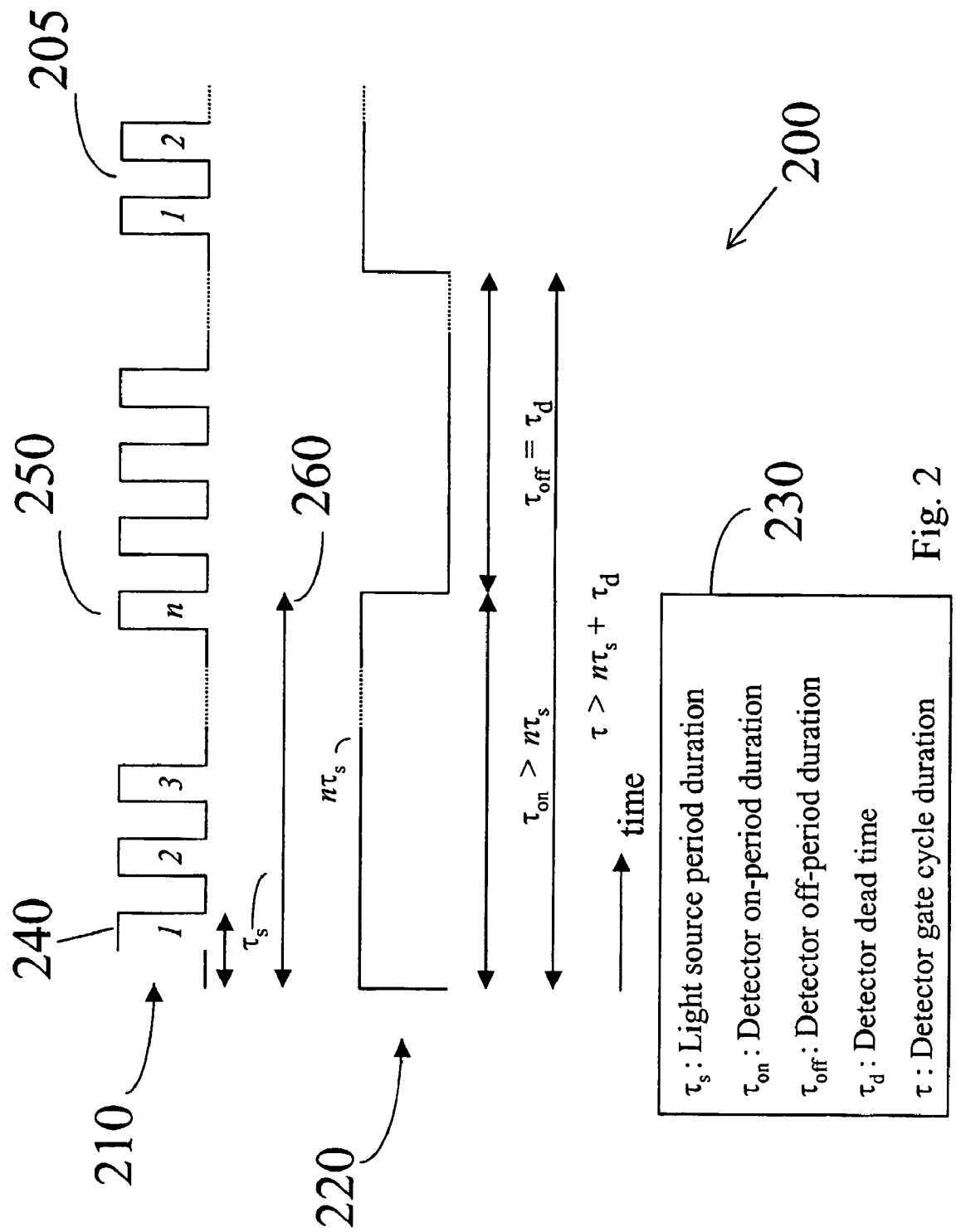
FIG. 2 shows a timing diagram for a first method of using the preferred embodiment in FIG. 1.
Figure 3:
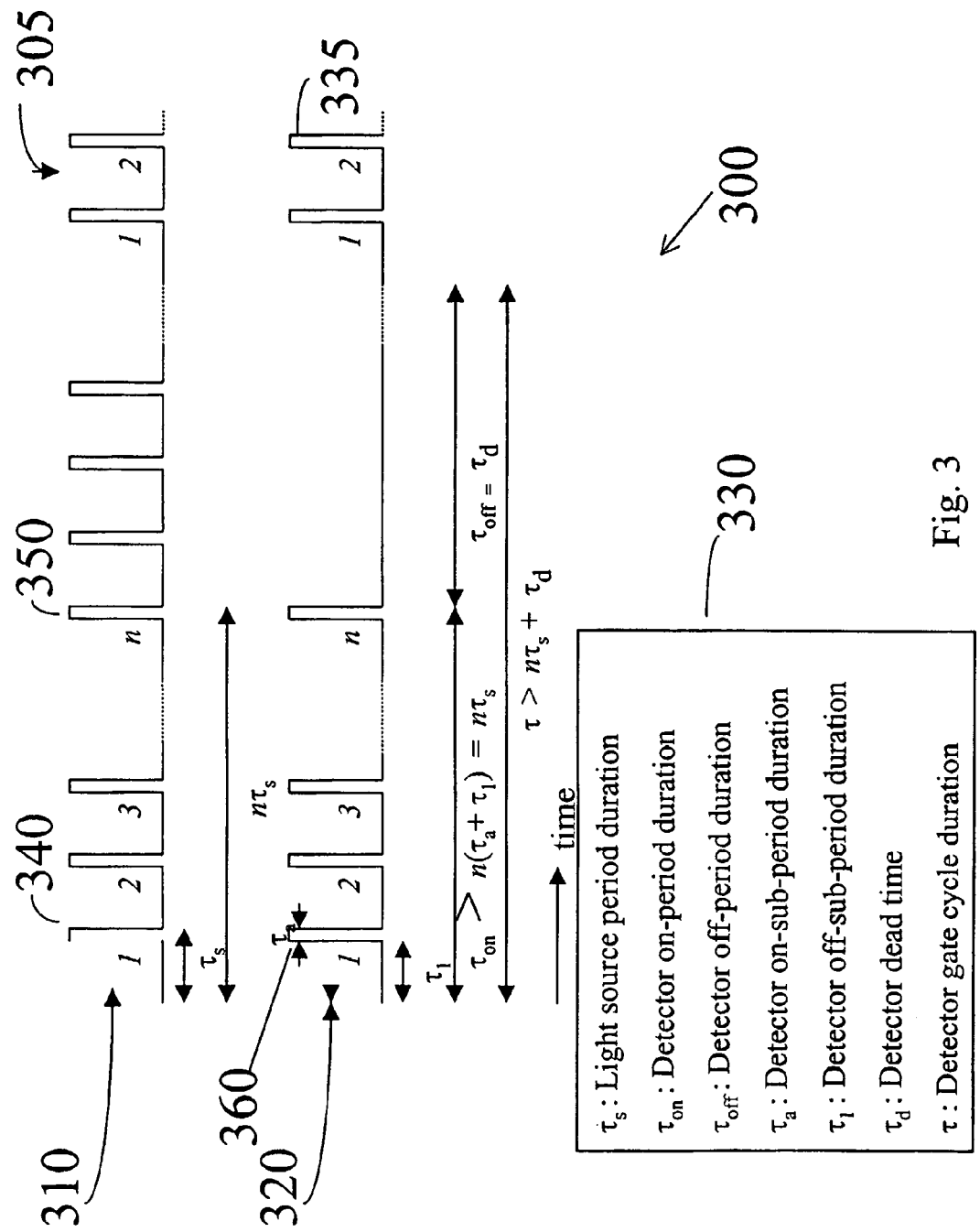
FIG. 3 shows a timing diagram for a second method of using the preferred embodiment of FIG. 1.
Figure 4:
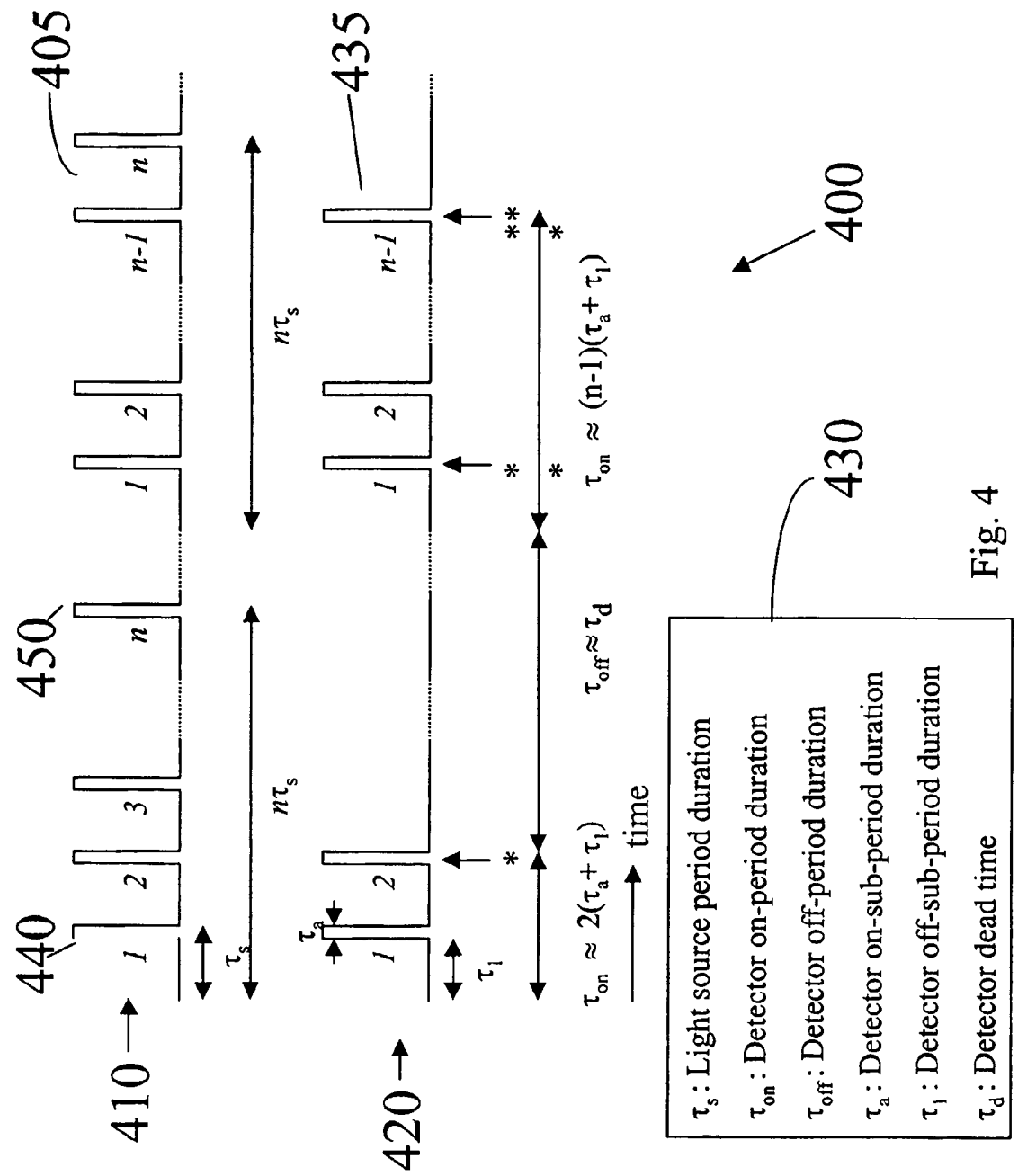
FIG. 4 shows a timing diagram for a third method of using the preferred embodiment of FIG. 1.

Source 20 produces a plurality of sequences of n pulses, which are plotted as source power versus time in FIGS. 2, 3, and 4 for different methods of using the preferred embodiment. Source 20 may consist of a coherent light source or an incoherent light source. Source 20 emits pulses directly or emits continuous light from which a pulser or amplitude modulator slices pulses. Channel 30 conveys photons from source 20 to attenuator 40. If source 20 provides sufficiently low enough intensity pulses, attenuator 40 is not necessary. Channel 50 conveys photons from attenuator 40 to detector 60. The peak power per pulse from source 20 and the optical density of attenuator 40 are such that attenuator 40 dims the light to the single photon (or low photon number) level per pulse. Each optical pulse contains an average number $\bar{n}$ of photons. Detector 60 detects one pulse from each sequence of n dim light pulses per detection cycle. The symbol $\eta$ represents the effective transmission coefficient, combining channel losses and detector efficiency.

Elements 70–130 are an electronic control system for the source, detector, and attenuator. These elements also provide a processing unit to convert the detection of one of n pulses per sequence into random bits. They comprise controller 140, detector and gating electronics 70, time correlated photon counter, 90, and microprocessor/memory 110. Controller/pulser/clock controls timing of light from source 20, timing of detector gating electronics 70, timing of time correlated photon counting 90, and timing of microprocessor/memory processing. Controller pulser/clock 140 may be one device or distinct devices. The pulser pulses and/or forms the drive unit for source 20. The pulser may serve as the clock to synchronize the entire apparatus of the invention, or the controller may have an independent clock locked to the repetition rate of source 20. The controller also triggers the gating electronics 70 to change the bias voltage on the detector and triggers the time correlated photon counting 90 to start measuring the elapsed time until a photo detection event.

In the description that follows, the term controller denotes controller/pulser/clock 140. The circuitry of the detector and gating electronics, possibly controlled by controller 140, allow for the detection of weak light signals and recovery of the detector after a detection event. Detector gating electronics 70 bias detector 60 with preset voltages to be above or below breakdown. These biases set the detection efficiency either to the maximum (detector on) or to approximately zero (detector off), respectively. A successful detection produces a large electrical current flow, which is called the avalanche. Detector/gating electronics 70 quench the avalanche by lowering the bias voltage below breakdown temporarily. Detector gating electronics 70 also convert the avalanche current into an electronic output signal to send to the time-interval analyzer after a successful photo detection event in order to stop the elapsed time measurement. Time-correlated photon counting 90 or another time-interval analyzer, possibly employing a time-to-amplitude converter and multi-channel analyzer, measures the elapsed time until a successful photo detection with respect to the start trigger (timing reference) described above. Time-correlated photon counting 90 converts the elapsed time into a voltage. Time-correlated photon counting 90 bins that voltage (the measure of the arrival time) into one of n voltage ranges corresponding to the n pulses. It outputs to microprocessor/memory 110 a digital or analog signal that specifies that bin number, which represents a raw random integer. "Raw" means that the integers may yet undergo processing to remove statistical correlations between them and to remove any biases toward certain values.

Microprocessor/memory 110 accepts the output from the time-correlated photon counting 90. Microprocessor/memory 110 performs computational operations, as described below, on the bin numbers from successive sequences of light pulses. These operations create statistically independent random bits from the raw random integers. These independent bits form the output of the RNG.

The memory device of microprocessor/memory 110 stores the raw and independent random bits, as necessary. The memory device also outputs the bits, for example as digital electrical signals, when queried by a request circuit or a device external to the invention. The memory device may also have a continuous bit-output mode, synchronized to the apparatus clock or a clock external to the invention. In these ways the memory device may output random numbers at a rate equal to or slower than the overall random bit generation rate of the system. Additional electrical connections may be made between all electronic components for synchronizing and systematizing the electronic elements of the random number generation apparatus.

For an APD detector, the source must operate in the detector's wavelength range of sensitivity. For example, a coherent or partially coherent source may be a solid-state, semiconductor, dye, free electron or other laser. An 830 nm (1550 nm) semiconductor laser works well with silicon (InGaAs/InP) APDs.

Silicon avalanche photo diode operating in Geiger mode are available from Perkin Elmer: (1) SPCM-AQR-1X (X goes from 2 to 6 for decreasing value of the dark counts) is sensitive to wavelengths between 400 nm and 1100 nm, with quantum efficiency near to 90% and photon detection efficiency near to 60% for the range 650–830 nm. This detector is actively quenched and has a gating function. This detector is also available in the model SPCM-AQR-1X-FC with a fiber optic receptacle pre-aligned to the detector. (2) C30902S (or C30921 S that includes a light pipe) operates in the range between 400–1000 nm with quantum efficiency 60% for 900 nm and 77% at 830 nm. Both passive and active quenching are possible for this detector. A modification of this detector (NIR-enhanced) is also available for the infrared (IR) range, with quantum efficiency of 40% at 1064 nm. Another company from which Silicon APDs are available is GE Canada Electro Optics (SPCM-100-PQ, can be used in the wavelength range 400–1060 nm).

InGaAs APD detector used in 1310 nm and 1550 nm long, intermedia and short range application are available from Perkin Elmer (SRNBA 2.5, SRMBA 1.2, SRAA155, 622, 1.2), Fujitsu (FPD5WIKS), EG&G (C306444EJT-07 and 30733), NEC (NDL 5551PC), Epitaxx (EPM239AA). To use these detectors effectively for one photon counting it is necessary to construct circuits to realize Geiger mode, passive or active quenching, gating and eventually a cooler to reduce dark counts. See A. Karlsson et al., Circuits and Devices 11, 34 (1999). In particular the last three mentioned models work efficiently at 1550 nm when cooled at −60° C. with Peltier cooling. NEC sells both Germanium and InGaAs devices such as NDL5102P and NDL5500P that can be used in the range 1000–1550 nm.

Single photon sources, including those that emit exactly one photon per pulse, may be available at visible and near-IR wavelengths in the future. Spontaneous parametric down conversion can also be used to create a source of single photons. For example, amplified ~800 nm Ti:Al$_2$O$_3$ laser pulses, frequency-doubled to ~400 nm, impinge on a non-linear crystal, such as BBO or LBO crystals available from Fujian Castech Crystals, to create a pair of photons, the signal and idler, with some probability. In this case a second APD detector may detect the idler photon to confirm the presence of the signal photon, in which case the signal photon may be used for RNG.

Longer wavelength sources, such as infrared lasers, microwave and millimeter wave antennas, or novel GHz and THz emitters, must operate with fast detectors such as bolometers, such as Si Bolometers, Si Composite Bolometers are available from Infrared Laboratories, or cooled photo conductors, such as 2000–12000 nm IR photoconductors series PCL-2TE, PCI-L-2TE, PCI-2TE available from VIGO System, or cooled CCDs available from JYHoriba and ANDOR Technology, to be of interest in RNG. Shorter wavelength sources, whether ultraviolet lasers, harmonically generated ultraviolet and x-ray pulses, synchrotrons, charged particle impacts in metal targets, laser-excited plasmas, UV and x-ray free electron lasers, or other processes that generate bursts of short-wavelength radiation, are consistent with the methods of the invention when used with fast, efficient detectors like the Bicron detectors, such as BICRON Inorganic Scintillator Detectors, Si APDs, or diamond detectors, which are in construction at CERN and in several universities.

As an alternative to coherent or partially coherent sources, an incoherent source may be an ultraviolet, visible, or near-infrared LED. An LED that emits light centered at 850 nm works with the silicon APD. Most coherent and incoherent light sources should give Poisson detection statistics in an APD used for random number generation, as discussed in L. Mandel and E. Wolf, Optical Coherence and Quantum Optics, Cambridge University Press, 1995, but the photon-number detection statistics are not critical to the methods of the invention. In a preferred embodiment of the apparatus, the source emits a stream of light pulses, for example, at 830 nm from a Picoquant diode laser with pulse duration of less than 100 ps and pulse separation $\tau_s$ down to 12.5 ns. The laser power is shown schematically in FIG. 2 before attenuation. This laser typically outputs average powers of ~1 mW. The Picoquant PDL800, the light source drive unit, acts as the pulser for the laser and provides the system clock operating at the repetition rate of $1/\tau_s$=80 MHz for controller 140. FIG. 2 also shows the temporal overlap of the pulse sequence with respect to the detector gate cycle, described below.

In a preferred embodiment a passive attenuator or attenuators (e.g., from Newport), such as neutral density filters or fixed setting variable optical attenuators, decrease the intensity of each pulse by the same amount. In this case, each pulse has the same average photon number ñ. The photon-number detection statistics are Poissonian, as discussed below. The attenuator can be placed immediately in front of the detector as long as it does not reradiate absorbed light into the detector path. Alternatively, a voltage-controlled variable attenuator operating at the source repetition rate may prove useful to create, for example, a sequence of n pulses such that each pulse has a probability of 1/n to cause a detection event. In this case each of the n photons in a sequence would have a different average photon number, which would be calibrated with the detector response to give a flat probability distribution for photo detections over the n pulses. A high-speed electro-optic modulator, for example driven by a function-generated RF signal for amplitude modulation and combined with a passive attenuator, may perform the voltage-controlled variable attenuator function.

For the preferred embodiment the channel is free space. Another possibility is standard SMF-28 optical fiber. The fiber channel may couple to pigtail fiber or fiber connectors, such as model SIFAM P2S13AA50, mounted to the source output and/or detector input in common commercial product configurations. Fiber coupling to the detector from free space can help to avoid stray late from affecting the operation of the detector.

In a preferred embodiment, a passively quenched silicon APD, operated in Geiger mode, detects the 830 nm light at single-photon light levels. APD model C30902S from EG&G/Perkin-Elmer provides detection efficiencies of about 50%. A thermoelectric cooler stage can help to provide temperature and operational stability near −20° C. The detector electronics then assure timing resolution on the order of a nanosecond and electronic output to signal a successful detection event. In particular, a high voltage source DC biases the detector at ~250 V, roughly 20 V below breakdown. This is the low detector gate voltage shown in FIG. 2. At this bias the detector is off. In accordance with the methods of the invention, the gating electronics—e.g., a fast rise time, TTL-controlled voltage supply—provides a transient voltage of roughly 40 V in series with the 250 V DC to bias the APD above breakdown and thus turn on the detector. When biased 20 V above breakdown, a successful detection event or dark count causes an avalanche current to flow through the APD. The remaining detector electronics consist, for example, of an avalanche-current limiting resistor of ~200 kΩ that connects the APD in series to a grounded ~50 Ω load resistor in parallel with an amplifier stage. The limiting resistor quenches the avalanche. The amplifier stage sends the amplified output to a discriminator, which clearly identifies the avalanche events. The discriminator then outputs a TTL pulse to controller 140 and time-interval analyzer to indicate these successful events to the system. Commercial amplifier and discriminator systems are available, for example, from Ortec/Perkin-Elmer.

Controller 140 provides several control functions for the system, as mentioned above. In the preferred embodiment a Xilinx FPGA unit, synchronized with the Picoquant PDL800 light source drive unit, forms controller 140. A combination of standard analog and digital chips could combine to form alternative controllers. A circuit designer can also create an application-specific printed circuit board layout, designed to perform all control functions.

A time-to-amplitude conversion circuit and a multi-channel analyzer combine to form a time-interval analyzer or counting device. Commercial units are available from Ortec/Perkin-Elmer, Becker & Hickl, and Edinburgh Electronics. The counting system receives standard TTL inputs to start and stop the counting process. The counting system sends TTL outputs to controller 140 and microprocessor/memory device as required. An embedded system or PC with an analog and/or digital I/O board can function as the microprocessor/memory device. Alternatively, the Xilinx FGPA unit serves as both controller and microprocessor/memory device to centralize system functions. Consistent with the methods of the invention, the combined controller and microprocessor/memory device must have a logical program to send timing signals to the gating electronics and time-interval analyzer at the appropriate times, collect and process output from the detector electronics and time-interval analyzer, and output random bits. The timing resolution and jitter of the electronics are sufficient to produce random numbers according to the examples given below for using the preferred embodiment of the apparatus.

The methods of the invention use the preferred embodiment of the apparatus to create a random integer from a plurality of sequences of n pulses emitted by the source. The attenuator attenuates the light so that each pulse of each sequence has a probability less than one to cause a successful detection. The methods dictate that the sum over n detection probabilities in each sequence approaches one, meaning one random photo detection will occur for each sequence. In the preferred embodiment, the channel for light propagation serves simply as a predictable means to relay the pulses to the detector. This means that the probability distribution for photo detection per sequence over the n pulses should be stationary and measurable. In this case the detection probabilities for the n discrete events per sequence form a discrete probability distribution. Thus, the methods using the preferred embodiment of the apparatus both create the discrete distribution and "sample" random integers from it.

The Poisson detection statistics of a passive attenuation scheme provide a sufficient probability distribution. The sum over the probabilities will approach one for certain minimum values of ñ that depend on n, as seen below. However, if a fast voltage-controlled attenuator sculpts the peak power of the n pulses to make a flat distribution with detection probability 1/n for each pulse of the sequence, then the methods of the invention require less processing to remove bias. The sum over the n probabilities of the flat distribution is unity by construction, guaranteeing a photo detection event in each sequence.

A source-detector timing cycle for an example of the first method of using the preferred embodiment is shown in FIG. 2.

FIG. 2 shows pulse verses time schematic 200 including pulse stream 210 versus time, detector gate voltage 220 versus time, and legend 230. Pulse stream 210 represents optical pulses generated by source 20 of FIG. 1. Pulses 1 . . . n, illustrated as all pulses between pulse 1 (element 240) and pulse n (element 250) have a duration equal to duration 260 of gate on time of detector gate voltage 220. Source 20's pulses 205 show the pulses at the beginning of a subsequent gating cycle. In the method corresponding to FIG. 2, detector 60 is set to have a gated on-period $\tau_{on}$ and off-period $\tau_{off}$ within each total detector period $\tau_A$.

FIG. 2 shows a typical, gate voltage pattern 220 versus time. At the high gate voltage, say 20 V above breakdown, the detector can detect photons. At the low voltage, say 20 V below breakdown, the detector does not respond to incident light.

In one detection cycle the time duration from the arrival at the detector of the leading edge of the first pulse in the sequence to the falling edge of the nth pulse defines $\tau_{on} > n\tau_s$. The expected arrival time (of the rising edge) of the first pulse at the detector defines a timing reference, used as the trigger time to start the time-interval analyzer. At or just before this time, controller 140 signals gating electronics 70 to bias detector 60 above breakdown, initiating the detector on-period. Controller 140 only signals gating electronics 70 to change the bias below breakdown at the expected time $n\tau_s$ of the falling edge of the nth pulse with respect to the trigger, initiating the off-period. During the on-period each of the n pulses can arrive at detector 60 only within fixed time slots numbered 1 to n in FIG. 2, with respect to the trigger time. For each on-period, detector 60 detects only one of the n pulses, but the exact pulse that detector 60 detects per sequence is a random event.

A dark count may occur when the detector is on. A dark count that occurs within the on-period but outside of one of the n time slots ruins that sequence of pulses for random number generation: the time-interval analyzer will not bin such an event into one of the n voltage ranges that correspond tmo the light pulse timeslots. A dark count during one of the n timeslots would mimic a photo detection event. The dark counts are also random events, but they have a different probability distribution than the photodetections and are best avoided by keeping $\tau_{on} << \tau_d$. Once detector 60 detects a photon in a slot $n_d < n$, the APD is relatively unresponsive for the remainder of $\tau_{on}$ if $\tau_{on} << \tau_d$ and if after-pulsing is not a problem. Since this method does not require gating electronics 70 to lower the bias voltage below breakdown until after the nth pulse arrives, a dark count or after-pulse during one of the time slots after a photodetection event within the same detection cycle is unlikely. Regardless, the time-interval analyzer only registers the first event per n pulse sequence. A photodetection event can only occur during one of the n timeslots defined by the source pulses. Thus, the timeslot number of the detected pulse corresponds to a random integer from 1 to n (with information equal to $\log_2 n$ bits). Since detection electronics 70 converts the avalanche into a signal that stops time correlated photon counting 90 after a successful detection, the bin number that is output by time correlated photon counting 90 equals the raw random integer given by the time slot number.

During the off-period, controller 140 controls gating electronics 70 to hold detector 60's bias voltage below breakdown for a time $\tau_{off} > \tau_d$. The off-period allows the detector electronics to quench the avalanche and return the detector to full efficiency. The off-period also reduces the dark count rate compared to a detector that is continuously (DC) biased above breakdown. When this off-period has elapsed, detector 60 will detect properly when biased above breakdown again. Controller 140 resets the time correlated photon counting 90 before the off-period. Controller 140 then synchronizes the next source pulse as the first pulse of a new on-period, as seen in the right hand side of FIG. 2. Synchronization of the detector period with source 20 requires $\tau_{off}$ to be slightly different than $\tau_d$ so that the detector cycle remains locked to the source clock. The cycle repeats to create the next random integer from the new sequence of n pulses. Thus, $$t_A > n\tau_s + \tau_d. \tag{3}$$

As an example, for n=8, $n\tau_s$=100 ns and $\tau_d$=1 μs, the total detector period would be $\tau_A$>1.1 μs.

This method of using the preferred embodiment dictates that the average photon number ñ of each of the n pulses, given the efficiency η, creates a probability that approaches unity to have one detection event per sequence. From Poisson statistics, ignoring dark counts, the probability of one photo detection in n consecutive pulses (or equivalently time slots) if ñ is the same for each pulse is:

$$P = 1 - \exp[-n\tilde{n}\eta]1. \tag{4}$$

This expression assumes that only one pulse per sequence can cause a detection event. A small probability exists that a detection event will not occur during the time $\tau_{on}$, in which case that sequence of n pulses does not produce a random number. With $\eta\tilde{n}$=0.56 and n=8, $P=1-\exp[-n\tilde{n}\eta] \approx 0.99$. However, the probability to detect a photon in any single pulse per on-period declines as the pulse number increases. For example, if the probability to detect a photon in the mth pulse is given by P(m), then $P(1)=1-\exp[-\tilde{n}\eta]$, $P(2)=P(1)*(1-P(1))$, $P(3)=P(1)*(1-P(1)-P(2))$, . . . In other words, P(m) is given by $\exp[-(m-1)\tilde{n}\eta]-\exp[-m\tilde{n}\eta]$. (By definition, the sum $P=P(1)+P(2)+ \ldots +P(n)$ gives equation (4).) Such a scheme requires the RNG to remove bias from the detection-generated bits, as described below. In principle, we can distribute the photon detection probability per time slot evenly over the n pulses (e.g., to reduce the computational effort needed to remove bias from the bit stream). This could be done, for example, by programming a voltage-controlled attenuator with a function generator to vary ñ as a function of m in such a way to make P(m)=1/n for a set of n pulses. To implement this, the bandwidth of such a variable attenuator system should provide fast enough switching times to keep up with the source repetition rate $1/\tau_s$. Controller 140 would then synchronize the function generator to the source-detector system.

From equation (3), ignoring any need for removing bias for the moment, the random bit production rate is roughly $$R = \log_2 n / \tau_A \tag{5}$$

with a limit of $R=\log_2 n/\tau_d$ for $n\tau_s << \tau_d$. For n=8 and $\tau_A$=1.1 μs, equation (5) gives a rate of 2.7 MHz.

The produced raw bits, as a stream, may contain correlations, as well as biases toward specific values. For example, correlations arise if the probability to detect a pulse in the current sequence depends on the previous successful detection event(s). Bias arises if the detection probability in each of the time slots m is not uniform. The need to remove correlation and bias is well known in random number generation. See for example, see J. von Neumann, Monte Carlo Method, Applied Math Series, 12, U.S. National Bureau of Standards, Wash. D.C., 36–38(1951); P. Elias, Annals Of Math Stats 43, 865 (1972); Y. Peres, Annals of Stats 20, 590 (1992). Elias gives a method to remove correlations in a single bit generator that extends to multi-bit generators. Elias' method does not reduce the number of bits and works on the random integers as produced. Von Neumann's method allows bias removal on uncorrelated bits of a single bit generator by selecting out only the 0–1 and 1–0 pairs and mapping them onto 1 and 0, respectively. Peres gives an iterative procedure based on Von Neumann's method that can approach the full entropy of the bit stream. Practically, these mathematical procedures imply that bits do not have to be thrown out while removing correlation and bias if the entropy of the string approaches one per bit. As a result, the random bit rate R can approach equation (5) if the computational time to remove correlation and bias is negligible compared to the dead time.

Microprocessor/memory 110 collects the random integers and converts the raw string of random integers from photo detection events into a final string of statistically independent random bits using the above or similar computational methods. If the raw random integers created by successful detections are statistically independent already, each integer represents $\log_2 n$ final random bits. As a result, for short on-periods compared to the off-periods, this method can provide a random number generation rate that approaches $R = \log_2 n / \tau_d$. This rate can be substantially larger than $1/\tau_d$. For raw strings with correlations and/or bias, if the computational procedures to create independent bits are fast compared to the dead time and reduce the number of bits by the factor h (roughly the entropy per bit), the random number generation rate can approach $R = h \log_2 n / \tau_d$.

In a second method of using the embodiment of the apparatus, controller 140 and gating electronics 70 divide detector 60's on-period duration $\tau_{on}$ of the first method into a sequence of n on-sub-periods of duration $\tau_a$ and n off-sub-periods of duration $\tau_1$: $\tau_{on} = n(\tau_a + \tau_1) > n\tau_s$. Detector 60 can detect photons or record dark counts during the on-sub-periods and cannot detect light or record dark counts during the off-sub-periods. FIG. 3 shows this rapid gating method schematically, where the source pulses and corresponding on-sub-periods are labeled 1 to n.

FIG. 3 shows pulses verses time schematic 300 including pulse stream 310 versus time, detector gate voltage 320 versus time, and legend 330. Pulse stream 310 represents optical pulses generated by source 20 of FIG. 1. Pulses 1 . . . n, illustrated as all pulses between pulse 1 (element 340) and pulse n (element 350) each have a duration equal to, or more practically, slightly shorter than, duration 360 of gate voltage pulses of detector gate voltage 320. Source 20's pulses 305 show the pulses at the beginning of a subsequent gating cycle. Duration 360 shows the duration of gating of voltage on detector 60. With respect to the pulse durations and duration 360, the point is that there may be small time jitterings which can introduce bias in the random number generation. Therefore, it is not realistic, in practice, to set the two durations to be strictly equal to each other.

During the mth on-sub-period controller 140 triggers gating electronics 70 to turn on detector 60 only during the time window that corresponds to the expected arrival time of the mth pulse. Controller 140 should set the detector on-sub-period duration to be longer than the light pulse duration (to allow for electronic bandwidth constraints and timing jitter) but shorter than the time between pulses. The off-sub-periods are the time windows between the n pulses of the sequence when photons used for random number generation cannot arrive at detector 60. Controller 140 and gating electronics 70 turn off detector 60. Controller 140 maintains synchronization of the pulsed light source with these detector on- and off-sub-periods. To implement this method, the response of the APD detector coupled to its electronics must follow the changes in the applied bias voltage on the time scale $\tau_a$. Controller 140 and time correlated photon counting 90 can now correlate the n bins of time correlated photon counting 90 with the n possible detection time slots directly using the electrical signals that trigger the n gating on-sub-periods. In contrast, in the first method the n bins correlate with the expected arrival time windows of the n light pulses.

In other respects this second method operates like the first. Since controller 140 sets the off-period duration $\tau_{off}$ equal to the dead time $\tau_d$ as in the first method, the total detector period $\tau_B$ is now $$\tau_B = \tau_{on} + \tau_{off} > n(\tau_a + \tau_1) + \tau_d. \quad (6)$$

The second method lowers the dark count rate compared to the first method for the same $\tau_{on}$ and $\tau_d$ by the ratio $\tau_a/\tau_s$ since the light pulse durations and therefore the on-sub-periods $\tau_a$ may be much shorter than $\tau_s$. For example, specific values for the same source parameters as above might be $\tau_a = 5$ ns, $\tau_1 = 15$ ns, $\tau_s = \tau_a + \tau_1 = 20$ ns, n=8, and $\tau_d = 1$ µs. The rapid gating would reduce the dark counts by the ratio $\tau_a/\tau_s = 1/4$ compared to the first method example with $\tau_{on} = 160$ ns. Ideally, the total probability to detect a photon during $\tau_{on}$ is close to unity, as explained above. Controller 140 again precisely synchronizes the source and detector so that the next detection cycle after a time $\tau_{off}$ corresponds to the source clock. Then, the random bit production rate is roughly $$R = \log_2 n / \tau_B = \log_2 n / [n(\tau_a + \tau_1) + \tau_d] \quad (7)$$

from equation (6) with a limit of $R = \log_2 n / \tau_d$ for $n(\tau_a + \tau_1) \ll \tau_d$.

In the above two methods of using the preferred embodiment, the detector cycle is synchronous in the sense that controller 140 and gate electronics 70 always gate detector 60 in the same way. The time duration $\tau_{on} + \tau_{off}$ defines this periodicity. Detector 60's off-period always starts at the fixed time $\tau_{on}$ after the detector on-period begins, regardless of when a detection event takes place. The detector then remains off for a fixed time $\tau_{off}$.

A third method of using the preferred embodiment of the apparatus can improve the performance of the invention. This third method, which can be adapted from either of the gating schemes of the previous two methods, constitutes an asynchronous detector cycle. This means that a detection on-cycle of fixed duration is not required before gating electronics 70 lower the detector bias below breakdown for duration $\tau$off=$\tau_d$. Instead, detector 60's electronics sends positive logical signals both to time correlated photon counting 90 and controller 140 after a successful detection event. Controller 140 then triggers gating electronics 70 to lower the detector bias immediately, initiating the off-period. Alternatively, detector electronics automatically trigger gating electronics 70 directly to lower the bias voltage below breakdown after a photodetection and simultaneously signal controller 140.

The possibilities for each n-pulse sequence of interest are: (a) a detection event occurs at timeslot $n_d < n$, or (b) the time duration $n\tau_s$ relative to the timing reference elapses, corresponding to the arrival of the n pulses without a detection event. Possibility (b) only occurs with small probability, in which case the gating electronics lower the bias voltage as in the first two methods. The source, as before, produces pulses at the fixed repetition rate $1/\tau_s$. For this method, an example of detection events in the second time slot of one detector on-period and the (n−1)st timeslot of the subsequent on-period is given in FIG. 4. This example uses the rapid gating scheme of the second method. The key point is the following.

FIG. 4 shows pulse verses time schematic 400 including pulse stream 410 versus time, detector gate voltage 420 versus time, and legend 430. Pulse stream 410 represents optical pulses generated by source 20 of FIG. 1. Pulses 1 . . . n, illustrated as all pulses between pulse 1 (element 440) and pulse n (element 450). Source 20's pulses 405 show the pulses at the beginning of a subsequent gating cycle. In the method corresponding to FIG. 4, detector voltage pulses of a cycle cease after less than n pulses, as shown by last pulse 435 of a cycle, when detector 60 detects a pulse.

By initiating the off-period after a successful detection, this method prevents dark counts owing to after-pulsing. These may occur in the first two methods since the gating electronics maintain or raise the bias voltage above breakdown before the detection avalanche has quenched fully. As a result, this method is especially useful for InGaAs APDs with 1550 nm light sources. InGaAs APDs are available from EG&G/Perkin-Elmer.

The average on-period now has a duration that is shorter than in the previous two methods approximately by the ratio of the average detected pulse number divided by n, which reduces the average dark count probability. Specifically, the average on-period duration is now $\sim<m>\tau_s$ instead of $n\tau_s$, where $<m>$ is the average pulse detected in each n-pulse sequence. For example, for uniform probability of detection of the mth pulse, $P(m)=1/n$, the average detection occurs for $<m>=(n+1)/2$. In a rapid gating scheme like the second method, $<m>\tau_s=(n+1)(\tau_a+\tau_1)/2$ gives an average bit rate:

$$R \approx \log_2 n / [(n+1)(\tau_a+\tau_1)/2+\tau_d]. \quad (A)$$

(One finds the rate for the Poisson statistics of equation (4) by calculating $<m>=(1-e^{-\bar{n}\eta})^{-1}-n(e^{n/\bar{n}n}-1)^{31}\ {}^1<n$.) In general, a synchronous detector cycle adapted from the first method above may produce bits at a rate $$\log_2 n / \tau_d > R > \log_2 n / (n\tau_s+\tau_d) \quad (8)$$

while an asynchronous cycle adapted from the second method may produce bits at a rate $$\log_2 n / \tau_d > R > \log_2 n / [n(\tau_a+\tau_1)+\tau_d] \quad (9)$$

from equation (A). For short on-periods compared to off-periods, this method can provide a random bit generation rate that approaches $R=\log_2 n/\tau_d$.

A fourth method uses a variation of the apparatus shown in FIG. 1. The apparatus now contains additional means to split a pulse in time and/or space and delay the split signals with respect to one another. A single-photon source or an attenuated classical light source, as above, emits one pulse. For example, the additional elements split the single pulse into n sub-pulses that each travel along a different path in space and time to the detector. In the single photon case, the fiber couplers, delay lines, and additional channel elements relay the signal to the detector with as little degradation of the optical signal as possible. For light from the classical source, the probability distribution of photo detections can be adjusted with the attenuator, as above.

Figure 5:
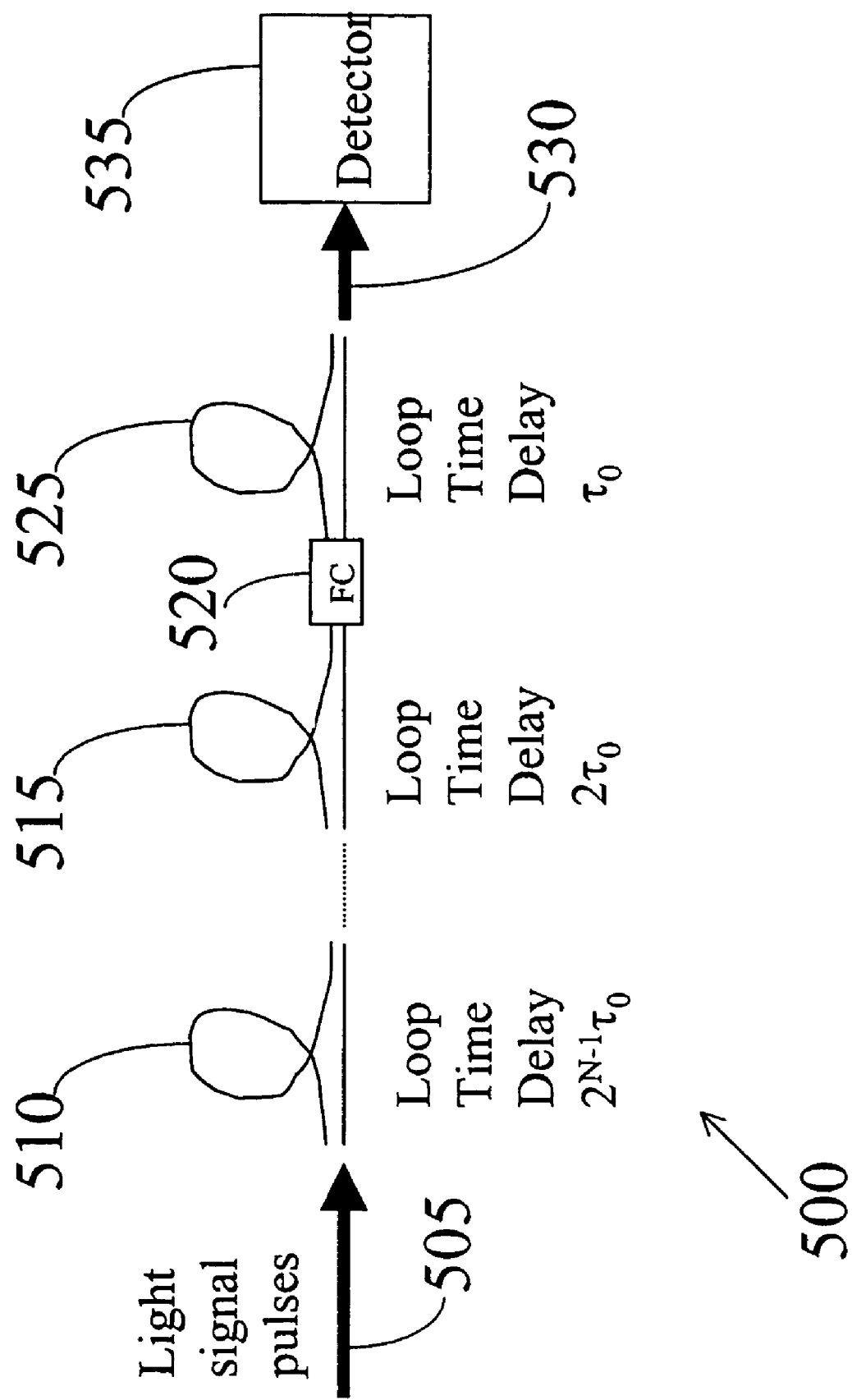
FIG. 5 outlines a method of using an embodiment of the present invention that splits a single signal into $n=2^N$ signals, which impinge on a detector.

The single pulse from the source becomes a superposition of n different sub-pulses, separated in time on arrival at the detector. FIG. 5 shows a schematic representation of an apparatus for such a process.

FIG. 5 shows device 500 including signal pulse channel 505, split signal delay loops 510, 515, 525 each of which is coupled to a non-delay channel via for example fiber coupler 520. Non-delayed and delayed pulses recombine and impinge detector 535 via channel 530.

For an example of use of device 500 shown in FIG. 5, take n to be a power of 2. A total of $1+\log_2 n$ 50:50 optical fiber couplers 520 and $\log_2 n$ fiber optic delay loops 510, 515, 525 exist. The source pulse enters the alternating system of fiber coupler—delay loop—fiber coupler—delay loop . . . After each fiber coupler 520, the signal splits between the two paths in the fiber delay line, one long and one short, before the next fiber coupler. After the last delay line, an additional fiber coupler or other beam recombination means recombines the two delay paths. These n sub-pulses at the detector now act as the n separate pulses used in the above three methods. In other respects, this method functions as one of the three methods above. One advantage to this temporal pulse splitting scheme is the reduction of physical resources compared to spatial beam splitting techniques. Using fiber, for example, the $\sim 1+2\log_2 n$ fiber devices can generate n sub-pulses and thus an N-bit random number with one detector, as described schematically in FIG. 5. (Alternatively, for a spatial beam splitting apparatus in free space, standard (spatial) beam splitters and n different detectors replace the fiber devices and single detector as additional means to split and delay pulses.) The sensitivity requirement of the electronic system is then a timing resolution sufficient to distinguish the time slots that represent the information, as in the other methods of using the preferred embodiment. As a result, for short on-periods compared to off-periods, this method can provide a random bit generation rate that approaches $R=\log_2 n/\tau_d$.

While the methods above envision specific implementations, the basic principle of the invention to translate a sequence of n discrete types of photo detection events into a multi-bit random number can increase the random number generation rate in other settings, especially for detectors with long dead times. For example, a detector with (long) effective dead times can record the timing information of continuous signal sources or a continuous random process like dark counts with respect to an external clock to form random numbers. Controller 140 may then provide electronic clocking for the detector on-and off-periods, and the continuous signal will translate into discrete data values after binning by the time interval counting electronics.

The asynchronous detection cycle, where the gating electronics shut off a detector for a duration slightly shorter than the dead time right after a detection event, applies to a general scheme where the photon time of arrival maps onto a random number. In addition, for the first and second methods above and other possible methods to use embodiments of the invention, subsequent detection events in the same on-period $\tau_{on}$, assumed to be unlikely, may occur. These subsequent detection events before the $\tau_{off}$ period begins may generate random numbers if considered, possibly increasing the RNG's rate further.

Various alternatives are available for a clock as well. Instead of having the external clock that pulses the source serve as a master clock for the detector directly, the light source itself can serve this purpose. For example, a beam splitter can split off a clock laser pulse from the main signal pulse before attenuation, detect that clock pulse in a PIN photo diode, and convert the diode signal into an electrical trigger through controller 140. In this alternative way controller 140 synchronizes the detector to the source, which is useful for longer channels. Additionally, the method and apparatus use the same channel or medium for calibration and synchronization as random number generation, for example by multiplexing clock and/or calibration light signals with the pulses that produce random numbers. See also U.S. Pat. No. 5,675,648 to Townsend.

While the summary and description of the preferred embodiment have focused on photons, the present invention applies to any type of signals and can be easily extended to time slot information from random events in multiple detector RNG schemes.

While only certain features of the present invention have been outlined and described herein, many modifications and variations will be apparent to those skilled in the art. Therefore, the claims appended hereto are intended to cover all such modifications and variations that fall within the broad scope of the invention.

We claim:

1. An apparatus for random number generation, comprising:
    a light source adapted to emit a number n of light pulses;
    an attenuator arranged to attenuate the n light pulses to form n attenuated light pulses each having an intensity such that the probability of detecting any one of the attenuated n light pulses is less than one;
    a single-photon detector arranged to receive the n attenuated light pulses, wherein the detector is gated for detection during n time slots; and
    electronics means for converting a detection of a light pulse in one of the n time slots into a random number between 1 and n.

2. The apparatus of claim 1, wherein the single-photon detector includes an avalanche photodiode.

3. A method of random number generation, comprising:
    providing a number n of light pulses each having an intensity such that the probability of detecting any one of the n light pulses is less than one;
    detecting one of the n light pulses with a single-photon detector gated to detect light pulses during n time slots; and
    converting the detection of the light pulse in one of the n time slots into a random number between 1 and n.

4. The method of claim 3, wherein the n light pulses includes a first pulse having an expected arrival time, and wherein the method further includes defining the n time slots based on the expected arrival time.

5. The method of claim 3, wherein the detecting is performed using an avalanche photodiode operating in Geiger mode.

6. The method of claim 3, further including using a plurality of n light pulses to create a series of random numbers between 1 and n.

7. The method of claim 3, further including attenuating the n light pulses.

8. The method of claim 3, wherein the detecting is performed using a detector having a dead time, wherein a detector off-time exists between each of the n time slots, and wherein the detector off time is equal to or greater than the detector dead time.

* * * * *